United States Patent

Hong

(10) Patent No.: US 11,330,643 B2
(45) Date of Patent: May 10, 2022

(54) METHOD AND DEVICE FOR IMPLEMENTING WIRELESS BACKHAUL, AND BASE STATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 85 days.

(21) Appl. No.: 16/849,440

(22) Filed: Apr. 15, 2020

(65) Prior Publication Data

US 2020/0245379 A1 Jul. 30, 2020

Related U.S. Application Data

(63) Continuation of application No. PCT/CN2017/106713, filed on Oct. 18, 2017.

(51) Int. Cl.
*H04W 76/10* (2018.01)
*H04W 48/06* (2009.01)
*H04W 48/10* (2009.01)

(52) U.S. Cl.
CPC .......... *H04W 76/10* (2018.02); *H04W 48/06* (2013.01); *H04W 48/10* (2013.01)

(58) Field of Classification Search
None
See application file for complete search history.

(56) References Cited

U.S. PATENT DOCUMENTS

| | | | | |
|---|---|---|---|---|
| 2013/0310052 A1* | 11/2013 | Timus | ............... | H04W 72/0433 |
| | | | | 455/445 |
| 2014/0126500 A1 | 5/2014 | Tang et al. | | |
| 2016/0353401 A1 | 12/2016 | Tapia et al. | | |
| 2017/0223576 A1* | 8/2017 | Roberts | ............. | H04W 72/0486 |

(Continued)

FOREIGN PATENT DOCUMENTS

| | | |
|---|---|---|
| CN | 102594455 A | 7/2012 |
| CN | 103906246 A | 7/2014 |

(Continued)

OTHER PUBLICATIONS

International Search Report in the International Application No. PCT/CN2017/106713, dated Jun. 27, 2018.

(Continued)

*Primary Examiner* — Hong S Cho
(74) *Attorney, Agent, or Firm* — Finnegan, Henderson, Farabow, Garrett & Dunner, L.L.P.

(57) ABSTRACT

A method for implementing a wireless backhaul is applied to a second base station with a wired backhaul capability and includes: receiving an access request message, the access request message carrying identity information; in a case that it is determined based on the identity information that a device requesting access is a first base station with only a wireless backhaul capability, determining, based on an available wired bandwidth of a wired backhaul link between the second base station and a core network, whether to allow the access of the first base station; and returning a response message to the first base station, the response message being configured to indicate whether the access of the first base station is allowed.

18 Claims, 12 Drawing Sheets

---

101 — An access request message is received, the access request message carries identity information 102 — In a case that it is determined based on the identity information that a device requesting access is a first base station with only a wireless backhaul capability, whether to allow the access of the first base station is determined based on an available wired bandwidth of a wired backhaul link between the second base station and a core network 103 — A response message is returned to the first base station, the response message is used to indicate whether the access of the first base station is allowed

(56) References Cited

U.S. PATENT DOCUMENTS

2017/0311378 A1    10/2017  Tsuda
2018/0020368 A1*    1/2018  Tapia ................... H04W 24/02
2018/0332658 A1    11/2018  Tsuda
2019/0281659 A1*    9/2019  Tsuda ................. H04W 84/045

FOREIGN PATENT DOCUMENTS

| CN | 104185245 A | 12/2014 |
| CN | 104412675 A | 3/2015 |
| CN | 106572480 A | 4/2017 |
| CN | 106912078 A | 6/2017 |
| EP | 3 209 051 A1 | 8/2017 |

OTHER PUBLICATIONS

English translation of the Written Opinion of the International Search Authority in the International Application No. PCT/CN2017/106713, dated Jun. 27, 2018.
Supplementary European Search Report in the European application No. 17929241.2, dated Jul. 16, 2020.
First Office Action of Chinese Application No. 201780001686.8, dated Aug. 27, 2020.

\* cited by examiner

METHOD AND DEVICE FOR IMPLEMENTING WIRELESS BACKHAUL, AND BASE STATION

CROSS-REFERENCES TO RELATED APPLICATIONS

This application is a continuation of and claims priority to International Patent Application No. PCT/CN2017/106713, filed on Oct. 18, 2017, the content of which is hereby incorporated by reference in its entirety.

TECHNICAL FIELD

The present disclosure generally relates to the technical field of communication, and more particularly, to a method and device for implementing a wireless backhaul and a base station.

BACKGROUND

In researches and discussions of 5th Generation (5G) projects, in order to meet requirements for more diversified services, higher rates, a larger number of connections and the like, spectrum efficiency is required to be greatly improved for a 5G network. Due to a transmission characteristic of a high band, a base station adopting high-band transmission is usually a small cell. If a conventional wired backhaul link (such as an optical fiber link) is configured for each small cell, this may bring high cost and complex deployment of backhaul links.

In order to reduce complexity of deployment of the backhaul links, a solution for an integration of a fronthaul and a backhaul is proposed in the researches and discussions of the 5G projects. That is, both data transmission between a base station and user equipment (UE) and data transmission between the base station and a core network are performed over wireless links through the same wireless communication system protocol. For implementing the integration of the fronthaul and the backhaul, a wireless backhaul implementation solution is needed for a 5G system so that a base station with only a wireless backhaul capability may also implement the backhaul through a base station with a wired backhaul capability.

SUMMARY

In a first aspect, a method for implementing a wireless backhaul may be applied to a second base station with a wired backhaul capability and include: receiving an access request message, the access request message carrying identity information; in a case that it is determined based on the identity information that a device requesting access is a first base station with only a wireless backhaul capability, determining, based on an available wired bandwidth of a wired backhaul link between the second base station and a core network, whether to allow the access of the first base station; and returning a response message to the first base station, the response message being configured to indicate whether the access of the first base station is allowed.

In a second aspect, a method for implementing a wireless backhaul may be applied to a first base station with only a wireless backhaul capability and include: when searching for a second base station with a wired backhaul capability, sending an access request message to the second base station, the access request message carrying identity information; monitoring a response message returned by the second base station based on the identity information; and responsive to detection of the response message indicating that access is allowed, establishing a wireless connection with the second base station, the wireless connection implementing the wireless backhaul of the first base station.

In a third aspect, a second base station with a wired backhaul capability may include: a processor; and a memory for storing instructions executable by the processor, wherein the processor is configured to: receive an access request message, the access request message carrying identity information; in a case that it is determined based on the identity information in the access request message that a device requesting access is a first base station with only a wireless backhaul capability, determine, based on an available wired bandwidth of a wired backhaul link between the second base station and a core network, whether to allow the access of the first base station; and return a response message to the first base station, the response message being configured to indicate whether the access of the first base station is allowed.

In a fourth aspect, a first base station with only a wireless backhaul capability may include: a processor; and a memory for storing instructions executable by the processor, wherein the processor is configured to: when searching for a second base station with a wired backhaul capability, send an access request message to the second base station, the access request message carrying identity information; monitor a response message returned by the second base station based on the identity information in the access request message; and responsive to detection of the response message indicating that access is allowed, establish a wireless connection with the second base station, the wireless connection implementing the wireless backhaul of the first base station.

In a fifth aspect, a non-transitory computer-readable storage medium has stored thereon instructions that, when executed by a processor of a second base station with a wired backhaul capability, cause the second base station to perform the method for implementing a wireless backhaul according to the first aspect.

In a sixth aspect, a non-transitory computer-readable storage medium has stored thereon instructions that, when executed by a processor of a first base station with only a wireless backhaul capability, cause the first base station to perform the method for implementing a wireless backhaul according to the second aspect.

It is to be understood that the above general description and detailed description below are exemplary and explanatory and not intended to limit the present disclosure.

BRIEF DESCRIPTION OF THE DRAWINGS

The accompanying drawings, which are incorporated in and constitute a part of this specification, illustrate the embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of devices and methods consistent with aspects related to the present disclosure as recited in the appended claims.

Figure 1A:
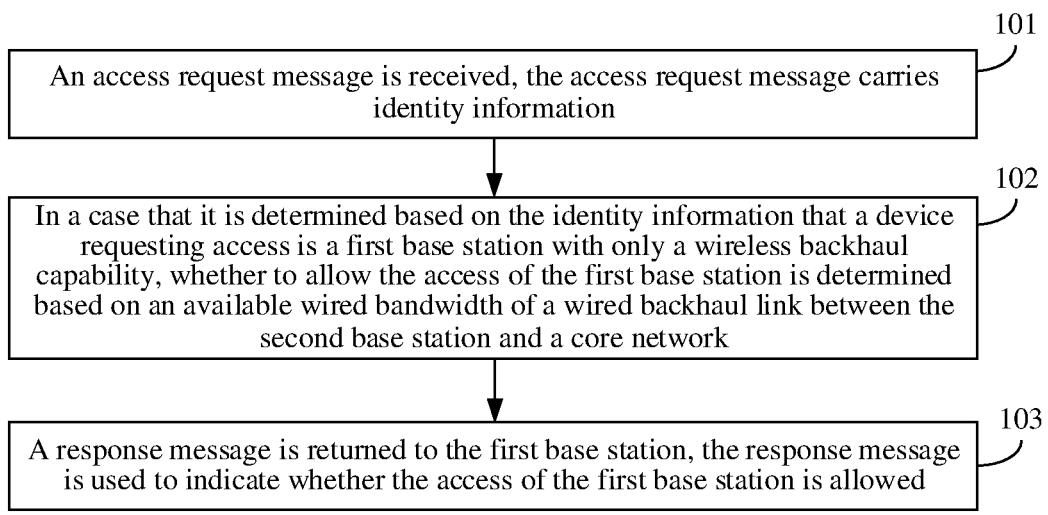
FIG. 1A is a flowchart of a method for implementing a wireless backhaul according to some embodiments.
Figure 1B:
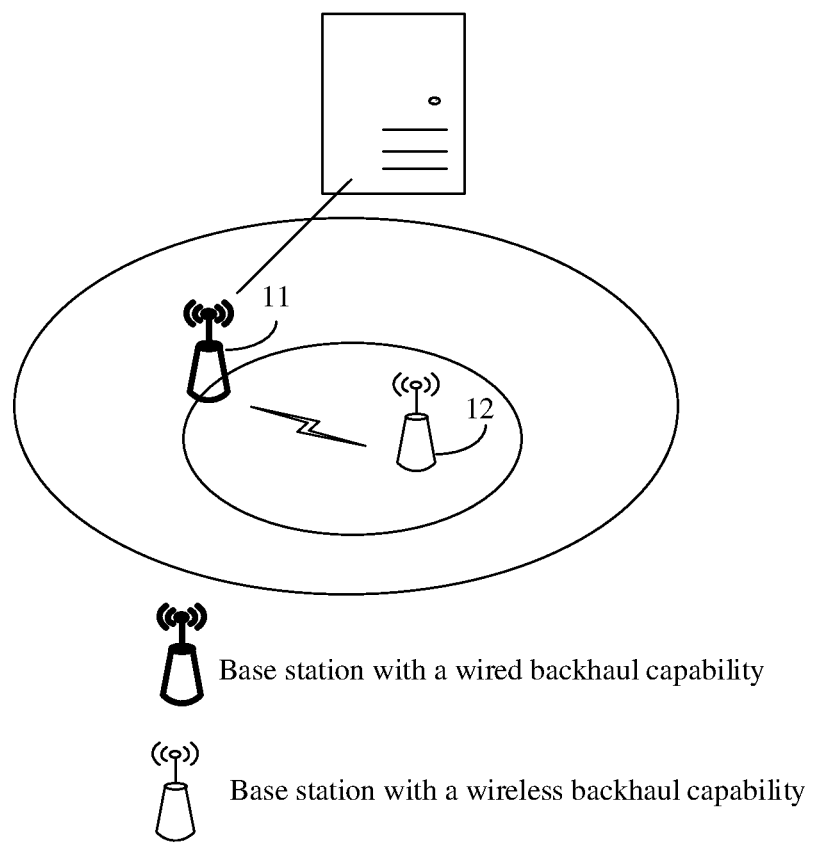
FIG. 1B is a first diagram of an application scenario of a method for implementing a wireless backhaul according to some embodiments.

FIG. 1A is a flowchart of a method for implementing a wireless backhaul according to some embodiments. FIG. 1B is a schematic diagram of an application scenario of the method for implementing a wireless backhaul according to some embodiments.

In embodiments of the present disclosure, there may be two types of base stations in coverage of a core network. Referring to FIG. 1B, a base station 11 with a wired backhaul capability is in the coverage of the core network, and a wired backhaul link is deployed between the base station 11 with the wired backhaul capability and the core network. A base station 12 with a wireless backhaul capability is also in the coverage of the core network, and no wired backhaul link is deployed between the base station 12 with the wireless backhaul capability and the core network. The base station 12 with the wireless backhaul capability may establish a wireless connection with the base station 11 with the wired backhaul capability to implement wireless backhaul.

The method for implementing the wireless backhaul may be applied to a base station with a wired backhaul capability, referred to as a second base station. As illustrated in FIG. 1A, the method for implementing the wireless backhaul includes the following Blocks 101-103.

In Block 101, an access request message is received, wherein the access request message carries identity information.

In an embodiment, the access request message may be a first message MSG1 in a random access procedure in the related art or a third message MSG3 in the random access procedure in the related. The identity information of a device may be carried in the access request message, and the identity information is used to indicate a device type of the device requesting access. In an embodiment, the device type may be a base station with a wireless backhaul capability or may be user equipment (UE). In an embodiment, if the device requesting access is the base station with the wireless backhaul capability, the identity information may be carried in the access request message; if the device requesting access is a normal UE, the identity information may not be carried in the access request message.

In an embodiment, the access request message may also be a newly defined dedicated message which is used by a base station with a wireless backhaul capability in requesting establishment of a wireless connection with the second base station with the wired backhaul capability, and the access request message may further carry the identity information for indicating that the device requesting access is the base station with the wireless backhaul capability.

In Block 102, in a case that it is determined based on the identity information that a device requesting access is a first base station with only a wireless backhaul capability, whether to allow the access of the first base station is determined based on an available wired bandwidth of a wired backhaul link between the second base station and a core network.

In an embodiment, the available wired bandwidth of the wired backhaul link between the second base station with the wired backhaul capability and a core network device may be obtained based on a difference value between a total wired bandwidth of the wired backhaul link and an occupied bandwidth of the wired backhaul link. For example, if the total bandwidth of the wired backhaul link is 6.4 GB/s and the occupied bandwidth is 3.2 GB/s, the remaining available wired bandwidth is 3.2 GB/s.

Figure 2:
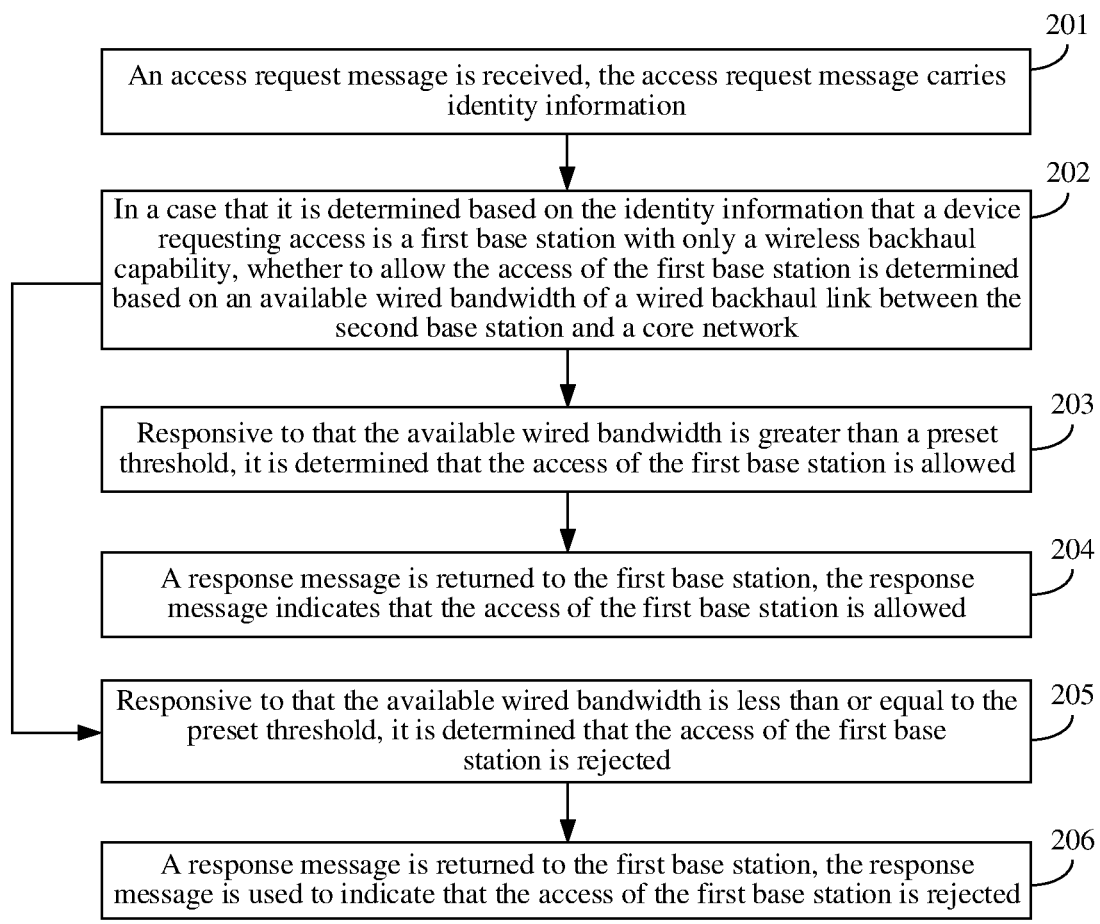
FIG. 2 is a flowchart of a method for implementing a wireless backhaul according to some embodiments.
Figure 3:
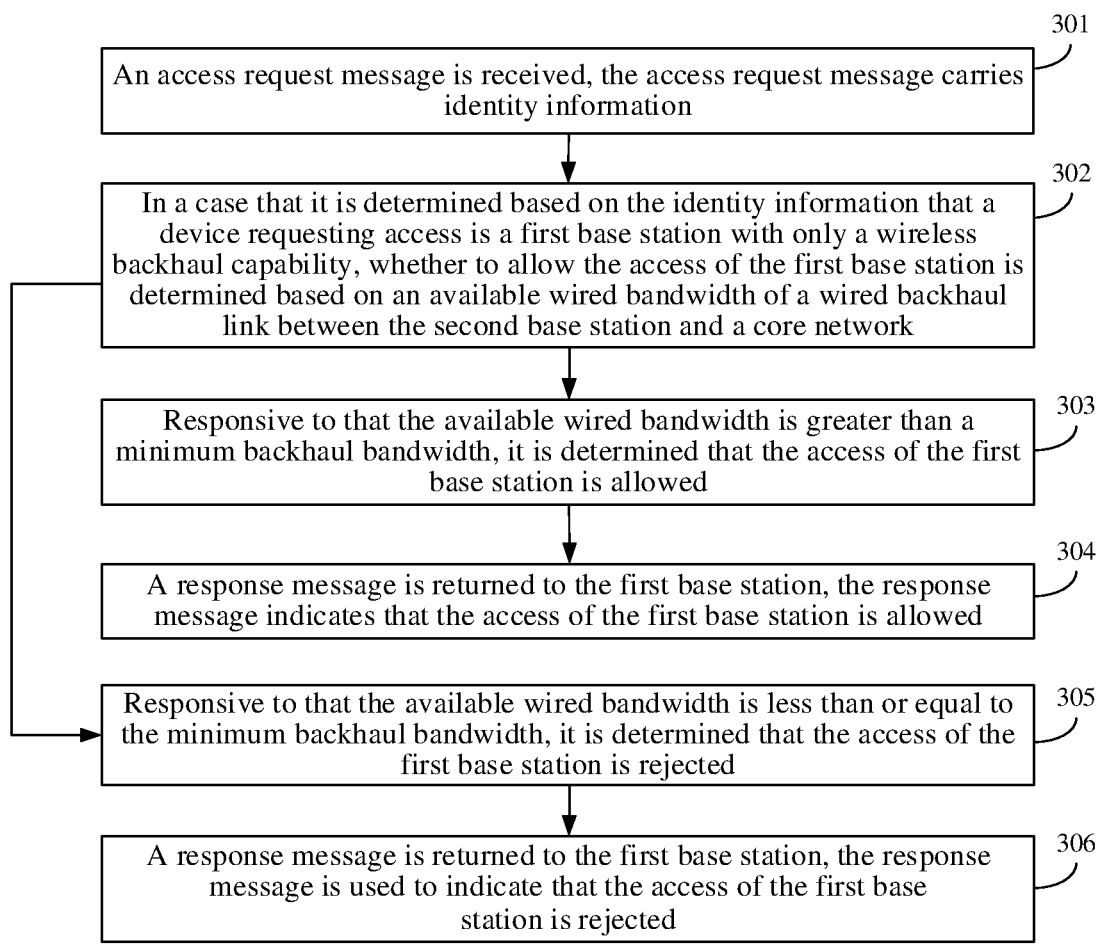
FIG. 3 is a flowchart of a method for implementing a wireless backhaul according to some embodiments.

FIG. 2 and FIG. 3 provide exemplary implementation manners of determining whether to allow the access of the first base station based on the available wired bandwidth of the wired backhaul link between the second base station and the core network, which will be further described below.

In Block 103, a response message is returned to the first base station, wherein the response message is used to indicate whether the access of the first base station is allowed.

In an embodiment, if the access request message is the first message MSG1 in the random access procedure, the response message is correspondingly a second message MSG2 in the random access procedure, and the response message carries indication information indicating whether the access of the first base station is allowed. In an embodiment, if the access request message is the third message MSG3 in the random access procedure, the response message may be a fourth message MSG4 in the random access procedure, and the response message carries indication information indicating whether the access of the first base station is allowed, and a wireless connection (i.e., a data and signaling connection) between the first base station and the second base station may be established based on the fourth message MSG4.

In an embodiment, if the access request message is the newly defined dedicated message, the response message may also be a new response message corresponding to the dedicated message.

In an embodiment, if the second base station with the wired backhaul capability allows the access of the first base station with the wireless backhaul capability, the first base station may establish a wireless connection with the second base station, the first base station may send backhaul data to the second base station through the wireless connection, and then the second base station transmits the backhaul data to the core network device through the wired backhaul link (e.g., an optical fiber link) to implement the wireless backhaul of the first base station.

Figure 1C:
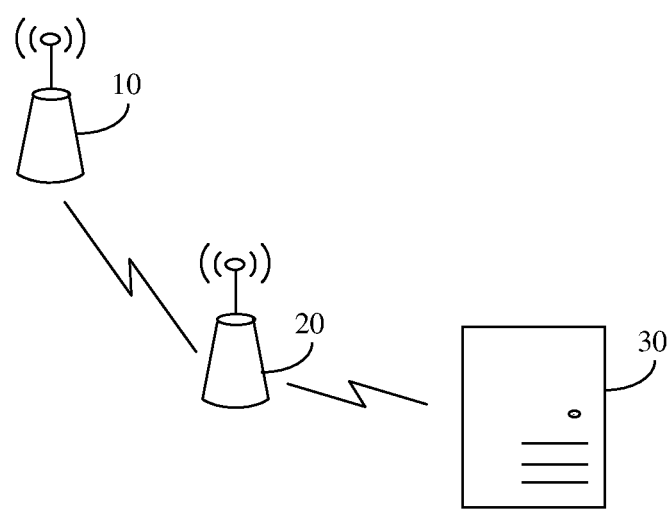
FIG. 1C is a second diagram of an application scenario of a method for implementing a wireless backhaul according to some embodiments.

FIG. 1C is a schematic diagram of an application scenario of the method for implementing a wireless backhaul according to some embodiments. As illustrated in FIG. 1C, the application scenario includes a first base station 10 with the wireless backhaul capability, a second base station 20 with the wired backhaul capability and a core network device 30. There is a wired backhaul link between the second base station 20 and the core network device 30. The second base station 20 may receive the access request message, and in a case that the second base station 20 determines based on identity information in the access request message that the device requesting access is the first base station 10 with the wireless backhaul capability, the second base station 20 may determine, based on its own present state (e.g., a present available wired bandwidth), whether to allow the access of the first base station 10. In a case that it is determined that the access of the first base station 10 is allowed, the first base station 10 implements the wireless backhaul through the wireless connection between the first base station 10 with the wireless backhaul capability and the second base station 20 with the wired backhaul capability.

In the embodiments of the present disclosure, after the second base station with the wired backhaul capability receives the access request message, if it is determined based on the identity information in the access request message that the device requesting access is the first base station with the wireless backhaul capability, the second base station determines, based on the available wired bandwidth of the wired backhaul link between the second base station and the core network, whether to allow the access of the first base station, and the corresponding response message is returned based on a determination result, so that the wireless connection may be established between the first base station with only the wireless backhaul capability and the second base station with the wired backhaul capability to implement the wireless backhaul.

FIG. 2 is a flowchart of a method for implementing a wireless backhaul according to some embodiments. The method for implementing the wireless backhaul is applied to a base station with a wired backhaul capability, referred to as a second base station. As illustrated in FIG. 2, the method includes the following operations.

In Block 201, an access request message is received, wherein the access request message carries identity information.

In Block 202, in a case that it is determined based on the identity information that a device requesting access is a first base station with only a wireless backhaul capability, whether to allow the access of the first base station is determined based on an available wired bandwidth of a wired backhaul link between the second base station and a core network, and Block 203 or Block 205 is executed.

Block 201 and Block 202 are similar to Block 101 and Block 102 (FIG. 1A).

In Block 203, responsive to that the available wired bandwidth is greater than a preset threshold, it is determined that the access of the first base station is allowed, and Block 204 is executed.

In an embodiment, the preset threshold may be a fixed value, and is preconfigured by a system or is set by the base station. Since the second base station with the wired backhaul capability is also required to serve a UE, the second base station is required to reserve a wired bandwidth not less than the preset threshold to serve a UE that has accessed the second base station or is to access the second base station. For example, if the available wired bandwidth of the wired backhaul link for the second base station is 3.2 GB/s and the preset threshold is 1.6 GB/s, the second base station may determine that the access of the first base station is allowed.

In an embodiment, the preset threshold may be a dynamically changing value, and is determined based on a wired bandwidth for serving UE(s), the wired bandwidth for serving the UE(s) is determined by the second base station based on at least one of: the number of UEs that have presently accessed the second base station, or the number of UEs to be accessed that is determined based on historical access information. For example, if the second base station determines, based on at least one of the number of the UEs that have accessed the second base station or the number of the UEs to be accessed, that the wired bandwidth for serving the UEs is 3.2 GB/s and a wired bandwidth that has presently been occupied for serving the UEs is 1.8 GB/s, the preset threshold may be set as 1.4 GB/s, and the present available wired bandwidth is 3.2 GB/s greater than 1.4 GB/s, so that the second base station may determine that the access of the first base station is allowed.

In Block 204, a response message is returned to the first base station, wherein the response message indicates that the access of the first base station is allowed, and the flow ends.

Block 204 is similar to Block 103 (FIG. 1A).

In Block 205, responsive to that the available wired bandwidth is less than or equal to the preset threshold, it is determined that the access of the first base station is rejected.

In Block 206, a response message is returned to the first base station, wherein the response message is used to indicate that the access of the first base station is rejected.

In the embodiments of the present disclosure, after receiving the access request sent by the first base station with the wireless backhaul capability, the second base station with the wired backhaul capability may determine, based on a comparison result of the available wired bandwidth and the preset threshold, whether to allow the access of the first base station. The preset threshold may be a fixed value or a dynamically changing value that is reserved by the second base station for the UEs that have accessed the second base station or is to access the second base station, so that the second base station may determine whether to allow the access of the first base station on the premise of determining that there is no influence on services for the UEs, thereby avoiding both the first base station and the second base station being unable to normally serve the UEs due to that the second base station, when its own condition does not allow the access of the first base station, makes the access of the first base station.

FIG. 3 is a flowchart of a method for implementing a wireless backhaul according to some embodiments. The method for implementing the wireless backhaul is applied to a base station with a wired backhaul capability, referred to as a second base station. As illustrated in FIG. 3, the method includes the following operations.

In Block 301, an access request message is received, wherein the access request message carries identity information.

In Block 302, in a case that it is determined based on the identity information that a device requesting access is a first base station with only a wireless backhaul capability, whether to allow the access of the first base station is determined based on an available wired bandwidth of a wired backhaul link between the second base station and a core network, and Block 303 or Block 305 is executed.

Block 301 and Block 302 are similar to Block 101 and Block 102 (FIG. 1A).

In Block 303, responsive to that the available wired bandwidth is greater than a minimum backhaul bandwidth, it is determined that the access of the first base station is allowed, and Block 304 is executed.

In an embodiment, the access request message may further carry the minimum backhaul bandwidth required by the first base station. For example, if the minimum backhaul bandwidth required by the first base station is 0.8 GB/s and the remaining available wired bandwidth of the second base station is 1.6 GB/s, the second base station may determine that the access of the first base station is allowed.

In Block 304, a response message is returned to the first base station, wherein the response message indicates that the access of the first base station is allowed, and the flow ends.

Block 304 is similar to Block 103 (FIG. 1A).

In Block 305, responsive to that the available wired bandwidth is less than or equal to the minimum backhaul bandwidth, it is determined that the access of the first base station is rejected.

In Block 306, a response message is returned to the first base station, wherein the response message is used to indicate that the access of the first base station is rejected.

In the embodiments of the present disclosure, the second base station may determine, based on the minimum backhaul bandwidth of the first base station requesting access and the available wired bandwidth, whether to allow the access of the first base station, so that a backhaul bandwidth not less than the minimum backhaul bandwidth may be provided for the first base station after the access of the first base station is allowed, thereby ensuring that the first base station, after accessing the second base station, may implement normal wireless backhaul and ensuring the efficiency of data transmission.

Figure 4:
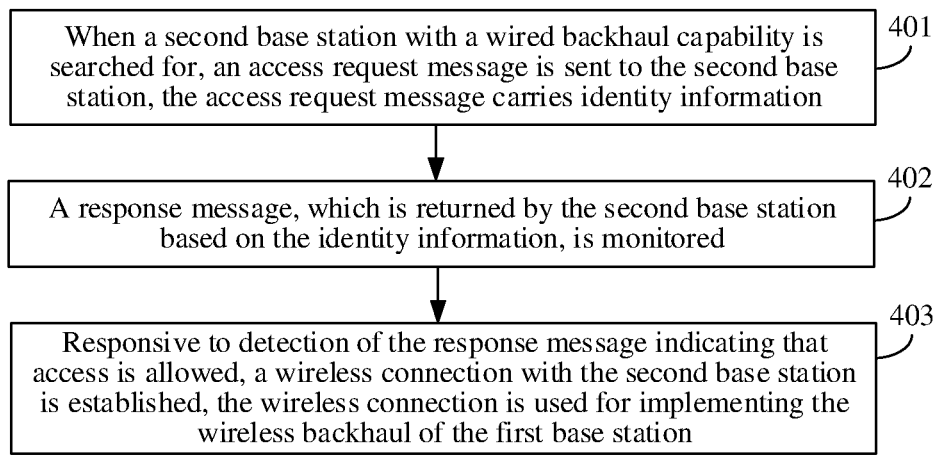
FIG. 4 is a flowchart of a method for implementing a wireless backhaul according to some embodiments.

FIG. 4 is a flowchart of a method for implementing a wireless backhaul according to some embodiments. The method for implementing the wireless backhaul may be applied to a base station with a wireless backhaul capability, referred to as a first base station. As illustrated in FIG. 4, the method includes the following Blocks 401-403.

In Block 401, when a second base station with a wired backhaul capability is searched for, an access request message is sent to the second base station, wherein the access request message carries identity information.

In an embodiment, the identity information is used to indicate that the first base station is a base station with the wireless backhaul capability rather than a normal UE.

In an embodiment, the access request message may be a first message MSG1 in a random access procedure in the related art or a third message MSG3 in the random access procedure in the related art.

In an embodiment, the access request message may also be a newly defined dedicated message which is used by the first base station with the wireless backhaul capability in requesting establishment of a wireless connection with the second base station with the wired backhaul capability, and the access request message may carry the identity information for indicating that the device requesting access is the base station with the wireless backhaul capability.

In Block 402, a response message, which is returned by the second base station based on the identity information, is monitored.

In an embodiment, if the access request message is the first message MSG1 in the random access procedure, the response message may be a second message MSG2 in the random access procedure. In an embodiment, if the access request message is the third message MSG3 in the random access procedure, the response message may be a fourth message MSG4 in the random access procedure.

In an embodiment, if the access request message is the newly defined dedicated message, the response message may also be a new response message corresponding to the dedicated message.

In Block 403, responsive to detection of the response message indicating that access is allowed, a wireless connection with the second base station is established, wherein the wireless connection is used for implementing the wireless backhaul of the first base station.

In an embodiment, the second base station with the wired backhaul capability is a base station having a wired transmission link (e.g., an optical fiber link) with a core network, and the first base station with the wireless backhaul capability is a base station having no wired transmission link with the core network and capable of implementing wireless backhaul through a wireless connection with the second base station with the wired backhaul capability.

For example, as illustrated in FIG. 1C, the first base station 10 with the wireless backhaul capability, after being powered on, may search for, around the first base station 10, the second base station 20 with the wired backhaul capability; send, after finding the second base station 20, the access request message to the second base station 20, the access request message indicating that the first base station 10 is a base station with the wireless backhaul capability; and establish, upon monitoring of the response message which is returned by the second base station 20 based on the access request message and which indicates that access is allowed, the wireless connection with the second base station 20 and implement the wireless backhaul through the wireless connection.

In the embodiments of the present disclosure, the base station with the wireless backhaul capability may establish the wireless connection with the base station with the wired backhaul capability to thus implement wireless backhaul.

Figure 5:
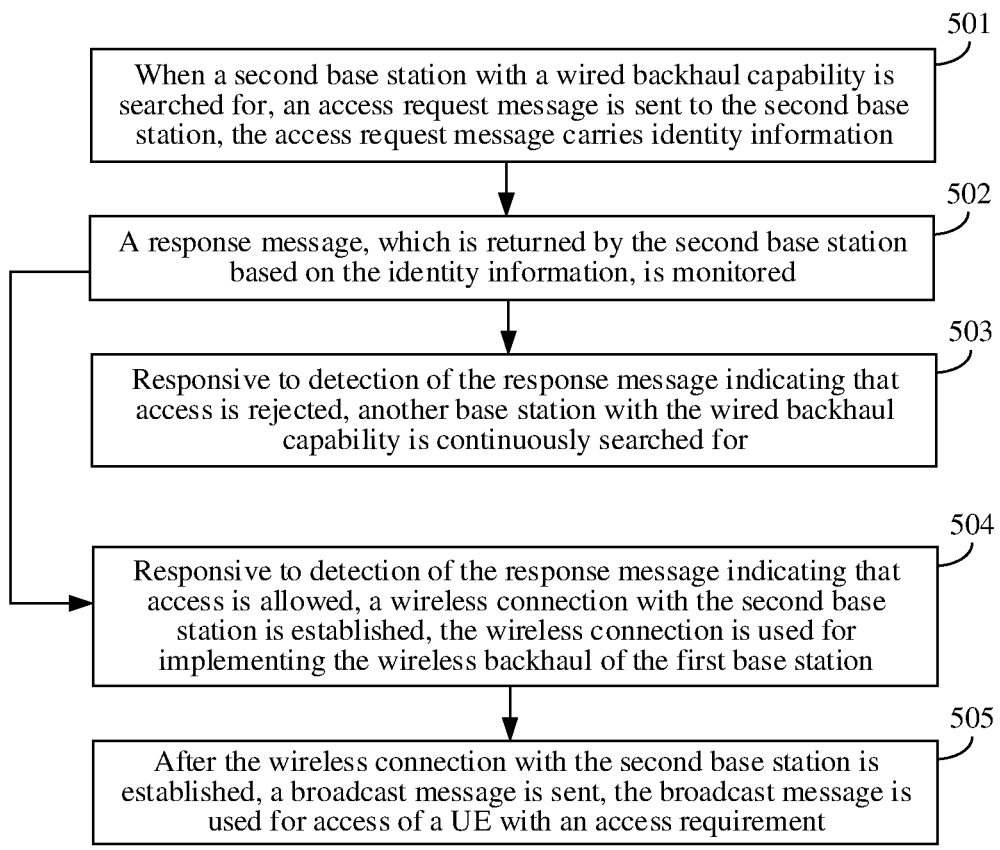
FIG. 5 is a flowchart of a method for implementing a wireless backhaul according to some embodiments.

FIG. 5 is a flowchart of a method for implementing a wireless backhaul according to some embodiments. The method for implementing the wireless backhaul may be applied to a base station with a wireless backhaul capability, referred to as a first base station. As illustrated in FIG. 5, the method includes the following operations.

In Block 501, when a second base station with a wired backhaul capability is searched for, an access request message is sent to the second base station, wherein the access request message carries identity information.

In Block 502, a response message, which is returned by the second base station based on the identity information, is monitored, and Block 503 or Block 504 is executed.

Block 501 to Block 502 are similar to Block 401 to Block 402 (FIG. 4).

In Block 503, responsive to detection of the response message indicating that access is rejected, another base station with the wired backhaul capability is continuously searched for, and Block 501 is executed.

In an embodiment, the first base station, when monitoring the response message indicating that access is rejected, may continuously search for the base station with the wired backhaul capability; and send, when searching for another base station with the wired backhaul capability, the access request message to the another base station to try to access the another base station with the wired backhaul capability.

In an embodiment, the first base station, before successfully accessing the base station with the wired backhaul capability, may not send a broadcast message to avoid a situation that the service cannot be provided for a UE with an access requirement when the UE with the access requirement accesses the first base station.

In Block 504, responsive to detection of the response message indicating that access is allowed, a wireless connection with the second base station is established, wherein the wireless connection is used for implementing the wireless backhaul of the first base station.

In Block 505, after the wireless connection with the second base station is established, a broadcast message is sent, wherein the broadcast message is used for access of a UE with an access requirement.

In the embodiments of the present disclosure, the first base station with the wireless backhaul capability tries to establish the wireless connection with the base station with the wired backhaul capability to implement the wireless backhaul, and the first base station is forbidden to send the broadcast message before the wireless connection with the base station with the wired backhaul capability is successfully established, so as to avoid the situation that the service cannot be provided for a UE with an access requirement when the UE with the access requirement accesses the first base station.

Figure 6:
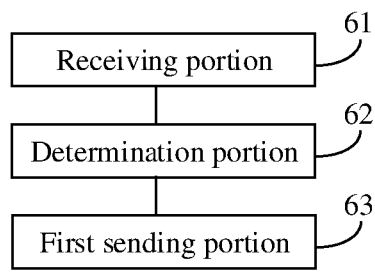
FIG. 6 is a block diagram of a device for implementing a wireless backhaul according to some embodiments.

FIG. 6 is a block diagram of a device for implementing a wireless backhaul according to some embodiments. The device may be part of a second base station with a wired backhaul capability, or the second base station. As illustrated in FIG. 6, the device includes: a receiving portion 61, a determination portion 62, and a first sending portion 63.

The receiving portion 61 is configured to receive an access request message, wherein the access request message carries identity information.

The determination portion 62 is configured to: in a case that it is determined based on the identity information in the access request message received by the receiving portion 61 that a device requesting access is a first base station with only a wireless backhaul capability, determine, based on an available wired bandwidth of a wired backhaul link between the second base station and a core network, whether to allow the access of the first base station.

The first sending portion 63 is configured to return a response message to the first base station, wherein the response message is used to indicate whether the access of the first base station is allowed.

Figure 7:
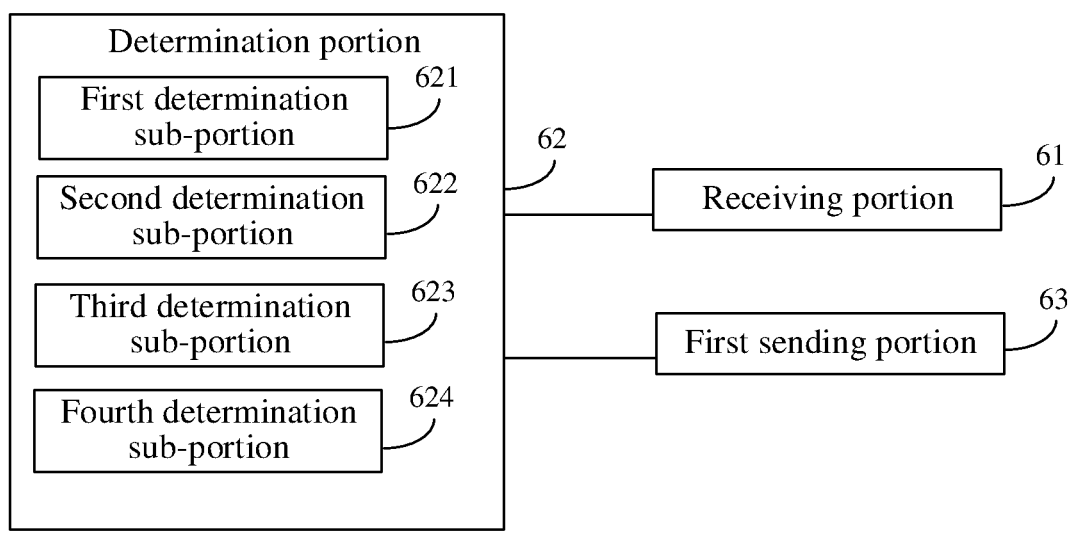
FIG. 7 is a block diagram of a device for implementing a wireless backhaul according to some embodiments.

FIG. 7 is a block diagram of a device for implementing a wireless backhaul according to some embodiments. As illustrated in FIG. 7, based on the embodiments illustrated in FIG. 6, the determination portion 62 includes: a first determination sub-portion 621, configured to: responsive to that the available wired bandwidth is greater than a preset threshold, determine that the access of the first base station is allowed; and a second determination sub-portion 622, configured to: responsive to that the available wired bandwidth is less than or equal to the preset threshold, determine that the access of the first base station is rejected.

In an embodiment, the access request message further carries a minimum backhaul bandwidth, and the determination portion 62 includes: a third determination sub-portion 623, configured to: responsive to that the available wired bandwidth is greater than the minimum backhaul bandwidth, determine that the access of the first base station is allowed; and a fourth determination sub-portion 624, configured to: responsive to that the available wired bandwidth is less than or equal to the minimum backhaul bandwidth, determine that the access of the first base station is rejected.

Figure 8:
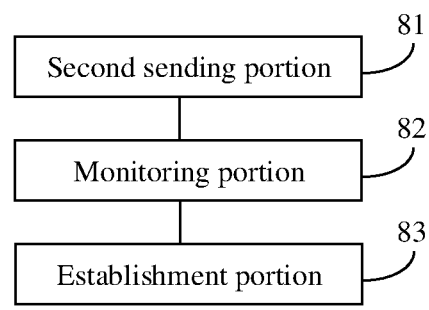
FIG. 8 is a block diagram of a device for implementing a wireless backhaul according to some embodiments.

FIG. 8 is a block diagram of a device for implementing a wireless backhaul according to some embodiments. The device may be part of a first base station with a wireless backhaul capability, or the first base station. As illustrated in FIG. 8, the device includes: a second sending portion 81, a monitoring portion 82, and an establishment portion 83.

The second sending portion 81 is configured to: in a case that a second base station with a wired backhaul capability is searched for, send an access request message to the second base station, here, the access request message carries identity information.

The monitoring portion 82 is configured to monitor a response message which is returned by the second base station based on the identity information in the access request message sent by the second sending portion 81.

The establishment portion 83 is configured to: responsive to that the monitoring portion 82 monitors the response message indicating that access is allowed, establish a wireless connection with the second base station, wherein the wireless connection is used for implementing the wireless backhaul of the first base station.

Figure 9:
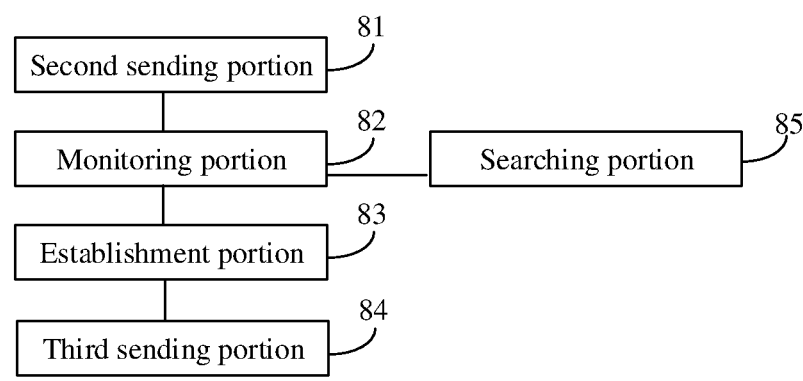
FIG. 9 is a block diagram of a device for implementing a wireless backhaul according to some embodiments.

FIG. 9 is a block diagram of a device for implementing a wireless backhaul according to some embodiments. Based on the embodiments illustrated in FIG. 8, the access request message further carries a minimum backhaul bandwidth.

In an embodiment, the device further includes: a third sending portion 84, configured to: after the wireless connection with the second base station is established, send a broadcast message, wherein the broadcast message is used for access of a UE with an access requirement.

In an embodiment, the device further includes: a searching portion 85, configured to: responsive to detection of the response message indicating that access is rejected, continuously search for another base station with the wired backhaul capability.

Figure 10:
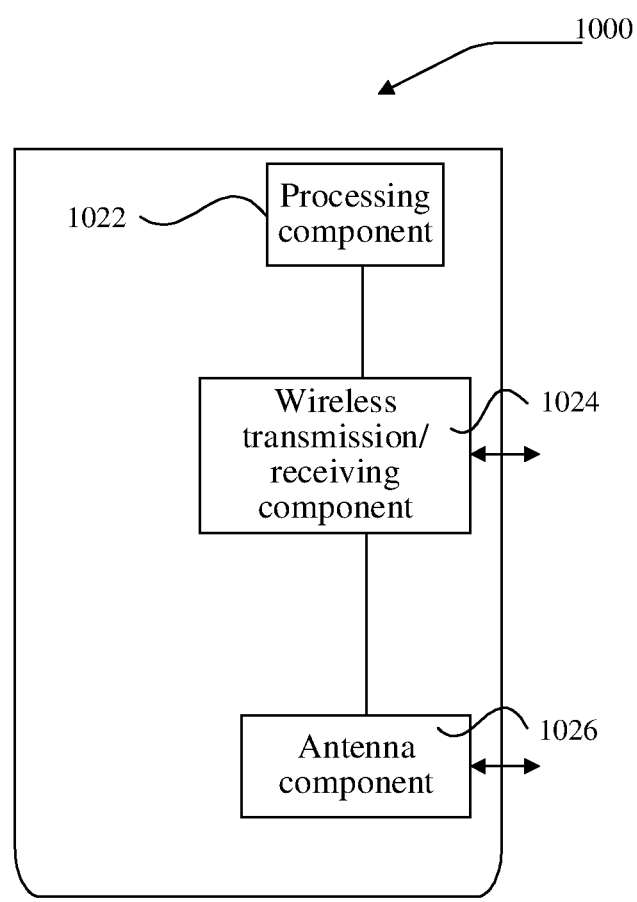
FIG. 10 is a block diagram of a device for implementing a wireless backhaul according to some embodiments.

FIG. 10 is a block diagram of a device 1000 for implementing a wireless backhaul according to some embodiments. The device 1000 may be provided as a base station. Referring to FIG. 10, the device 1000 includes a processing component 1022, a wireless transmission/receiving component 1024, an antenna component 1026 and a wireless interface-specific signal processing portion, and the processing component 1022 may further include one or more processors.

In an embodiment, the base station is a base station with a wireless backhaul capability, and a processor in the processing component 1022 may be configured to execute the above described method for implementing the wireless backhaul by the first base station with only the wireless backhaul capability.

In an embodiment, the base station is a base station with a wired backhaul capability, and a processor in the processing component 1022 may be configured to execute the above described method for implementing the wireless backhaul by the second base station with the wired backhaul capability.

In embodiments of the present disclosure, there is also provided a non-transitory computer-readable storage medium including instructions. The instructions may be executed by the processing component 1022 of the device 1000 to implement the above described methods, which may be performed by the second base station with the wired backhaul capability or the first base station with only the wireless backhaul capability. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Other implementations of the present disclosure will be apparent to those skilled in the art from consideration of the specification and practice of the present disclosure. The specification is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for implementing a wireless backhaul, applied to a second base station with a wired backhaul capability, the method comprising:
receiving an access request message from a first base station, the access request message carrying identity information to indicate that the first base station is a base station with only a wireless backhaul capability;
determining based on the identity information that the first base station has only a wireless backhaul capability, and determining, based on an available wired bandwidth of a wired backhaul link between the second base station and a core network, whether to allow the access of the first base station; and
returning a response message to the first base station, the response message being configured to indicate whether the access of the first base station is allowed.

2. The method of claim 1, wherein the determining, based on the available wired bandwidth of the wired backhaul link between the second base station and the core network, whether to allow the access of the first base station comprises one of:
responsive to the available wired bandwidth being greater than a preset threshold, determining that the access of the first base station is allowed; or
responsive to the available wired bandwidth being less than or equal to the preset threshold, determining that the access of the first base station is rejected.

3. The method of claim 2, wherein the preset threshold is a dynamically changing value determined based on a wired bandwidth for serving user equipment (UE), and the wired bandwidth for serving UE is determined by the second base station based on at least one of a number of UEs that have accessed the second base station or a number of UEs that are to access the second base station.

4. The method of claim 1, wherein the access request message further carries a minimum backhaul bandwidth, and
the determining, based on the available wired bandwidth of the wired backhaul link between the second base station and the core network, whether to allow the access of the first base station comprises one of:
responsive to the available wired bandwidth being greater than the minimum backhaul bandwidth, determining that the access of the first base station is allowed; or
responsive to the available wired bandwidth being less than or equal to the minimum backhaul bandwidth, determining that the access of the first base station is rejected.

5. A method for implementing a wireless backhaul, applied to a first base station with only a wireless backhaul capability, the method comprising:
when searching for a second base station with a wired backhaul capability, sending an access request message to the second base station, the access request message carrying identity information to indicate that the first base station is a base station with only a wireless backhaul capability;
monitoring a response message indicating whether to allow access of the first base station, returned by the second base station based on the identity information and an available wired bandwidth of a wired backhaul link between the second base station and a core network; and
responsive to detection of the response message indicating that access is allowed, establishing a wireless connection with the second base station, the wireless connection implementing the wireless backhaul of the first base station.

6. The method of claim 5, wherein the access request message further carries a minimum backhaul bandwidth.

7. The method of claim 5, further comprising:
after the wireless connection with the second base station is established, sending a broadcast message, for user equipment (UE) with an access requirement to access the first base station.

8. The method of claim 5, further comprising:
responsive to detection of the response message indicating that access is rejected, continuously searching for another base station with the wired backhaul capability.

9. A second base station with a wired backhaul capability, comprising:
a processor; and
a memory for storing instructions executable by the processor,
wherein the processor is configured to:
receive an access request message from a first base station, the access request message carrying identity information to indicate that the first base station is a base station with only a wireless backhaul capability;
determine based on the identity information in the access request message that the first base station has only a wireless backhaul capability, and determine, based on an available wired bandwidth of a wired backhaul link between the second base station and a core network, whether to allow the access of the first base station; and
return a response message to the first base station, the response message being used to indicate whether the access of the first base station is allowed.

10. The second base station of claim 9, wherein the processor is further configured to perform one of:
responsive to the available wired bandwidth being greater than a preset threshold, determining that the access of the first base station is allowed;
responsive to the available wired bandwidth being less than or equal to the preset threshold, determining that the access of the first base station is rejected.

11. The second base station of claim 10, wherein the preset threshold is a dynamically changing value determined based on a wired bandwidth for serving user equipment (UE), and the wired bandwidth for serving UE is determined by the second base station based on at least one of a number of UEs that have accessed the second base station or a number of UEs that are to access the second base station.

12. The second base station of claim 9, wherein the access request message further carries a minimum backhaul bandwidth, and the processor is further configured to perform one of:
responsive to the available wired bandwidth being greater than the minimum backhaul bandwidth, determining that the access of the first base station is allowed; or
responsive to the available wired bandwidth being less than or equal to the minimum backhaul bandwidth, determining that the access of the first base station is rejected.

13. A first base station with only a wireless backhaul capability, comprising:
a processor; and
a memory for storing instructions executable by the processor,
wherein the processor is configured to:
when searching for a second base station with a wired backhaul capability, send an access request message to the second base station, the access request message carrying identity information to indicate that the first base station is a base station with only a wireless backhaul capability;
monitor a response message indicating whether to allow access of the first base station, returned by the second base station based on the identity information in the access request message and an available wired bandwidth of a wired backhaul link between the second base station and a core network; and
responsive to detection of the response message indicating that access is allowed, establish a wireless connection with the second base station, the wireless connection implementing the wireless backhaul of the first base station.

14. The first base station of claim 13, wherein the access request message further carries a minimum backhaul bandwidth.

15. The first base station of claim 13, wherein the processor is further configured to:
after the wireless connection with the second base station is established, send a broadcast message, for user equipment (UE) with an access requirement to access the first base station.

16. The first base station of claim 13, wherein the processor is further configured to:
responsive to detection of the response message indicating that access is rejected, continuously search for another base station with the wired backhaul capability.

17. A non-transitory computer-readable storage medium having stored thereon instructions that, when executed by a processor of a second base station with a wired backhaul capability, cause the second base station to perform the method for implementing a wireless backhaul according to claim 1.

18. A non-transitory computer-readable storage medium having stored thereon instructions that, when executed by a processor of a first base station with only a wireless backhaul capability, cause the first base station to perform the method for implementing a wireless backhaul according to claim 5.

* * * * *